US009802869B2

(12) United States Patent
Podgorski et al.

(10) Patent No.: US 9,802,869 B2
(45) Date of Patent: Oct. 31, 2017

(54) METHOD FOR MANUFACTURING AN OXIDE/OXIDE COMPOSITE MATERIAL TURBOMACHINE BLADE PROVIDED WITH INTERNAL CHANNELS

(71) Applicant: SNECMA, Paris (FR)

(72) Inventors: Michael Podgorski, Paris (FR); Bruno Jacques Gerard Dambrine, Le Chatelet en Brie (FR); Ludovic Edmond Camille Molliex, Brunoy (FR); Beryl Cassandre Anne Mereaux, Bourg la Reine (FR)

(73) Assignee: SNECMA, Paris (FR)

( * ) Notice: Subject to any disclaimer, the term of this patent is extended or adjusted under 35 U.S.C. 154(b) by 939 days.

(21) Appl. No.: 14/099,094

(22) Filed: Dec. 6, 2013

(65) Prior Publication Data

US 2014/0161626 A1 Jun. 12, 2014

(30) Foreign Application Priority Data

Dec. 10, 2012 (FR) ...................................... 12 61838

(51) Int. Cl.
*C04B 35/64* (2006.01)
*F01D 5/18* (2006.01)
(Continued)

(52) U.S. Cl.
CPC ........ *C04B 35/64* (2013.01); *C04B 35/62873* (2013.01); *C04B 35/62876* (2013.01);
(Continued)

(58) Field of Classification Search
CPC ...... F01D 5/18; C04B 2235/5208–2235/5212; C04B 2235/5248; C04B 2235/616; C04B 2235/661
See application file for complete search history.

(56) References Cited

U.S. PATENT DOCUMENTS 4,684,322 A * 8/1987 Clifford .................. F01D 5/187
  415/175
5,961,661 A * 10/1999 Jessen ..................... C04B 35/49
  264/610
(Continued)

FOREIGN PATENT DOCUMENTS

EP    1 211 384 A2    6/2002
EP    1 215 183 A1    6/2002
(Continued)

OTHER PUBLICATIONS

French Preliminary Search Report dated Jul. 3, 2013 in French 12 61838, filed on Dec. 10, 2012 (with English Translation of category of Cited Documents).

*Primary Examiner* — Erin Snelting
(74) *Attorney, Agent, or Firm* — Oblon, McClelland, Maier & Neustadt, L.L.P.

(57) ABSTRACT

An oxide/oxide composite material turbomachine blade including a fiber reinforcement obtained by weaving a first plurality of threads and a second plurality of threads, with the threads of said first plurality of threads being arranged in successive layers and extending in the longitudinal direction of the fiber blank corresponding to the longitudinal direction of the blade is disclosed. The reinforcement is densified by a matrix, with the blade further including one or several internal channels having a coiled shape extending in the longitudinal direction of the blade.

8 Claims, 5 Drawing Sheets

(51) Int. Cl.
    *C04B 35/628*   (2006.01)
    *C04B 35/80*    (2006.01)
    *F01D 5/28*     (2006.01)

(52) U.S. Cl.
    CPC .............. *C04B 35/803* (2013.01); *F01D 5/18* (2013.01); *F01D 5/187* (2013.01); *F01D 5/282* (2013.01); *C04B 2235/3217* (2013.01); *C04B 2235/5212* (2013.01); *C04B 2235/5216* (2013.01); *C04B 2235/5224* (2013.01); *C04B 2235/5248* (2013.01); *C04B 2235/616* (2013.01); *C04B 2235/661* (2013.01); *F05D 2250/15* (2013.01); *F05D 2250/25* (2013.01)

(56) References Cited

U.S. PATENT DOCUMENTS

| | | | |
|---|---|---|---|
| 6,033,619 A * | 3/2000 | Hattori | B28B 1/002 264/629 |
| 7,549,840 B2 * | 6/2009 | Subramanian | C04B 35/573 29/889.2 |
| 2002/0076541 A1 * | 6/2002 | Jarmon | C04B 35/806 428/312.6 |
| 2002/0127104 A1 * | 9/2002 | Beeck | B23H 9/10 416/97 R |
| 2003/0175453 A1 | 9/2003 | Steffier | |
| 2003/0223861 A1 * | 12/2003 | Morrison | F01D 5/189 415/115 |
| 2006/0284337 A1 * | 12/2006 | Subramanian | C04B 35/573 264/258 |
| 2007/0007678 A1 * | 1/2007 | Benitsch | C04B 35/573 264/29.1 |
| 2013/0017094 A1 * | 1/2013 | Coupe | B29C 70/24 416/230 |

FOREIGN PATENT DOCUMENTS

| | | | |
|---|---|---|---|
| EP | 1 367 223 A2 | 12/2003 | |
| FR | 2955609 A1 * | 7/2011 | ............. B29C 70/24 |
| GB | 2 163 219 A | 2/1986 | |

\* cited by examiner

METHOD FOR MANUFACTURING AN OXIDE/OXIDE COMPOSITE MATERIAL TURBOMACHINE BLADE PROVIDED WITH INTERNAL CHANNELS

TECHNICAL FIELD

The invention relates to turbomachine blades provided with internal channels.

More precisely, the invention relates to a method for manufacturing an oxide/oxide ceramic matrix composite material turbomachine blade, provided with one or several internal channels used to cool the blade.

PRIOR ART

In order to reduce noise and turbulences at the blade root, it is known to make internal channels within the blades, which channels open out in the vicinity of the root and of the tip of the blade and which allow for the circulation of air.

The blades provided with these internal channels are generally made of a metal material, with the internal channels being hollowed out in the mass of the blade. However, machining internal channels in blades of metal material is quite difficult and can only be done on blades that have relatively simple geometries. In particular, it is not possible to machine internal channels in metal blades that have a twisted shape.

In order to obtain lighter blades, it is known to make blades out of composite material, i.e. by creating structural parts with a fiber reinforcement densified by a matrix. According to the technique disclosed in FR 2 955 609 (reference [1]), the blade is manufactured by three-dimensionally weaving a fiber blank, shaping the fiber blank in order to obtain a preform of the blade to be made, then making the preform denser by impregnation of the preform with a liquid composition containing a precursor of the material of the matrix and thermal treatment of the impregnated preform, in order to obtain a blade having a fiber reinforcement constituted by said preform and made denser by the matrix. In order to form internal channels in the blade while still preserving its mechanical integrity, threads made of a material with a sacrificial nature are introduced into the internal portion of the fiber blank and are eliminated after the preform is made denser. The sacrificial material can in particular be a heat-fusible material, such as polyvinyl acetate or polyethylene, or a material that can be dissolved by a solvent (water, alcohol, etc.) such as a soluble polymer, for example a PVA (polyvinyl alcohol).

Such organic matrix composite materials (or OCM) are generally used to make parts such as the blower or the compressor of a turbomachine. In order to make parts intended to resist higher temperatures, as for example low-pressure turbines, the use of ceramic matrix composite materials (or CMC) is preferred. More precisely, in order to reduce the cost of manufacturing blades and to improve their thermal stability under air at high temperature, it is herein sought to create oxide/oxide ceramic matrix composite blades, i.e. constituted of an oxide microporous matrix reinforced with oxide fibres; more preferably, it will be an alumina microporous matrix reinforced with alumina fibres.

In order to manufacture such a blade, the use of threads made of a material that can be dissolved by an aqueous solvent, for example threads with a water-soluble polymer base, is prohibited as the slush used for the impregnation of the preform is an aqueous suspension containing particles of oxide ceramics and the soluble polymer can thus pass into solution. Note that, hereinabove and hereinafter, the term "oxide ceramics" or "oxides" will be used indifferently, as oxides are a particular type of ceramics.

The use of threads made of a heat-fusible and water-insoluble material (for example a non-water-soluble polymer thread) can, in contrast, be considered; after the step of injecting the slush in the preform, a thermal treatment of sintering (for example at 1200° C. in the case of a slush containing particles of alumina) makes it possible to destroy the threads made of polymer and the channels left by the combustion of the polymer can then be used as cooling channels. However, it is possible that the blades obtained as such are not satisfactory, as the impregnation of the preform may not be homogeneous, which results in deteriorating the mechanical properties of the blade. It is indeed difficult to impregnate thick preforms due to the segregation of the alumina, which is able to hinder the access of the slush in the core of the fiber preform.

It is therefore desirable to be able to improve the distribution of the particles of the slush within the preform, in order to have oxide/oxide composite material blades, for the turbines of turbomachines, that comprise one or several internal channels used to cool the blade, while still having the required mechanical properties.

DESCRIPTION OF THE INVENTION

To do this, the invention has for object a method for manufacturing a composite material turbomachine blade, which comprises a fiber reinforcement densified by a matrix obtained by sintering particles and which has at least one cooling channel, with the method comprising the following successive steps:

a) shaping a fiber blank in order to obtain a preform of the blade to be manufactured, the fiber blank comprising a first plurality of threads and a second plurality of threads woven together, with the threads of the first plurality of threads being arranged in successive layers and extending in the longitudinal direction of the fiber blank which corresponds to the longitudinal direction of the blade to be manufactured, at least one layer of threads of the first plurality of threads located in the internal portion of the fiber blank comprising one or several threads made of a first sacrificial material and at least one thread made of a first sacrificial material being surrounded along its longitudinal direction by a thread made of a second sacrificial material;

b) a first densification of the preform comprising a first impregnation of the preform with an aqueous suspension containing particles of the matrix and a first sintering of the impregnated preform at a temperature ($T_{\theta 1}$) in order to obtain a blade having a fiber reinforcement constituted by the preform and densified by the matrix;

c) eliminating the thread or threads made of a first sacrificial material in order to form one or several internal channels in the blade;

d) a second densification of the preform comprising a second impregnation of the preform with an aqueous suspension containing particles of the matrix, with the aqueous suspension being introduced through the internal channel or channels formed in step c) and a second sintering of the impregnated preform at a temperature ($T_{\theta 2}$);

e) eliminating the thread or threads made of a second sacrificial material in order to form one or several cooling channels in the blade;

f) a third sintering of the matrix at a temperature greater than or equal to the sintering temperature of the matrix, in the case where the temperature of the second sintering ($T_{\theta2}$) would be lower than the sintering temperature of the matrix ($T_{sintering}$).

Thus, thanks to the method according to the invention, it is possible to manufacture composite material blades comprising improved cooling internal channels, while preserving the mechanical integrity of the structure of the blade. Indeed, according to the method of the invention, the channels are formed without alteration of the continuity of the reinforcing threads adjacent to the channels. Moreover, as the threads of sacrificial material are introduced into the reinforcement before the shaping of the fiber blank, it is possible to manufacture blades with complex shapes, in particular shaped by twisting, with internal cooling channels. On the other hand, thanks to the presence of the internal channels obtained after the step of eliminating threads made of a first sacrificial material, it is possible to bring the aqueous suspension containing particles to the core of the preform. With the second impregnation, a better density at the core is therefore obtained. Finally, the cooling channels, via their coiled shape, allow for a better cooling of the blade during use. Indeed, the twistage of a thread made of a second sacrificial material (for example a metal thread) around a thread made of a first sacrificial material (a polymer thread for example) makes it possible to increase the path—and therefore the exchange surface—of the air in contact with the blade, once the thread made of a second sacrificial material is eliminated.

It should be noted that the aqueous suspension used during the second densification is generally identical (same chemical composition of the particles and same concentration) to the one used during the first densification.

Moreover, it should be recalled that a sintering is a heat treatment process during which an agglomerate of particles (powder) is consolidated, without melting the whole.

Finally, hereinabove and hereinafter, the term "sacrificial" designates something that is sacrificed, intended to be destroyed. In the scope of the invention, a sacrificial material or a material with a sacrificial nature therefore designates a material intended to be destroyed, for example by heating (in order to melt it or burn it) or chemically (chemical dissolution).

Preferably, after having carried out the first and the second impregnation, the water contained in the aqueous suspension is evaporated before proceeding to the first and second sintering. This makes it possible to dry the impregnated preform and possibly unmold it.

Advantageously, the first and second sacrificial materials are materials chosen from among heat-fusible materials, materials that can be eliminated by a chemical agent and materials that can be eliminated by combustion under air, with these materials being non-soluble in the aqueous suspension and respectively having a melting or combustion temperature $T_1$ and $T_2$, with $T_1$ lower than $T_2$. The first material can be a polymer, for example polyvinyl acetate or polyethylene, while the second material is a material made of metal or carbon. The second material can for example be made of aluminium, which cannot be attacked by an aqueous suspension comprising a dispersant such as nitric acid.

Preferably, the step of eliminating threads made of a first sacrificial material (step c) is carried out by thermal treatment at a temperature greater than or equal to the melting or combustion temperature of the threads made of a first material and lower than the melting or combustion temperature of the threads made of a second material and the step of eliminating threads made of a second sacrificial material (step e) is carried out by chemical treatment, i.e. by the application of an acid or a base which will attack the threads made of a second material, or by thermal treatment at a temperature greater than or equal to the melting or combustion temperature of the threads made of a second material.

According to a preferred alternative of the method, the steps b) and c) are concomitant. In this case, the eliminating of the thread or threads made of a first sacrificial material takes place during the sintering at the temperature ($T_{\theta1}$) of the impregnated preform, with the first material being burnt or melted at a temperature lower than or equal to the sintering temperature ($T_{\theta1}$).

Depending on the choice of the second sacrificial material and its melting or combustion temperature, and more particularly depending on whether the melting or combustion temperature is lower than or greater than the sintering temperature of the matrix, the method according to the invention can be presented according to two alternatives.

According to a first alternative, if the melting or combustion temperatures of the first and second sacrificial materials ($T_1$) and ($T_2$) are lower than the sintering temperature of the matrix ($T_{sintering}$), the first sintering can be carried out at a temperature greater than the melting or combustion temperature of the first material ($T_1$) and lower than or equal to the melting or combustion temperature of the second material ($T_2$) and the second sintering can be carried out at a temperature lower than the melting or combustion temperature of the second material ($T_2$). In this case, the first and second densification result in partial sintering and it is then required to proceed with a final sintering (third sintering) at a temperature greater than or equal to the sintering temperature of the matrix in order to provide the matrix with the desired microporosity content.

According to a second alternative, if the melting or combustion temperatures of the first ($T_1$) and second ($T_2$) sacrificial materials are respectively lower than or equal, for the first material, and greater, for the second material, than the sintering temperature of the matrix, the first sintering can be carried out at a temperature greater than the melting or combustion temperature of the first material ($T_1$) and lower than or equal to the sintering temperature of the matrix ($T_{sintering}$), while the second sintering can be carried out at a temperature lower than or equal to the sintering temperature of the matrix ($T_{sintering}$); in this case, the first densification results in a partial sintering, while the second densification can result either in a partial sintering, or in a full sintering, depending on the temperature used during this second sintering; if the temperature of the second sintering is lower than the sintering temperature of the matrix, a third sintering must then be carried out at a temperature greater than or equal to the sintering temperature of the matrix.

In the case where the second material is carbon, then it can be eliminated during the sintering treatment which is carried out under air.

According to an aspect of the invention, the fiber blank can be carried out by three-dimensional weaving, with at least threads from the second plurality of threads linking threads of the first plurality of threads over several layers. The three-dimensional weaving may be a multilayer weaving with a weave of a type selected from at least one of the following weaves: satin, multi-satin, multi-plain and interlock.

Preferably, the particles of the aqueous suspension are made of an oxide ceramic material, more preferably of alumina. Preferably, the particles have a submicrometric size (i.e. between 0.1 and 1 micrometers).

The threads of the first plurality of threads other than the threads made of a first sacrificial material and of a second sacrificial material and the threads of the second plurality of threads are advantageously made of an oxide ceramic material, more preferably of alumina. The weight or the diameter of the threads made of a first and of a second sacrificial material is determined, respectively, depending on the size of the first and second internal channels to be manufactured in the blade, with the first internal channels being used for the second impregnation and the second internal channels being used for cooling the blade during operation by circulation of air.

The invention also relates to an oxide/oxide composite material turbomachine blade comprising a fiber reinforcement densified by a matrix, with the fiber reinforcement comprising a first plurality of threads and a second plurality of threads woven with each other, with the threads of the first plurality of threads being arranged in successive layers and extending in the longitudinal direction of the fiber blank corresponding to the longitudinal direction of the blade to be manufactured, with the blade comprising one or several cooling channels extending in the longitudinal direction of the blade, wherein the cooling channel or channels have a coiled shape. The blade can have a complex shape, and in particular a twisted shape. According to an aspect of the invention, the threads of the first plurality of threads and the threads of the second plurality of threads are made of alumina and the matrix of the composite material is made of alumina. The vane of the blade can furthermore have a profile with varying thickness.

The invention also concerns a turbomachine provided with a blade according to the invention or manufactured according to the method such as defined hereinabove.

The invention shall be better understood and other advantages and particularities shall appear when reading the following description, provided as an unrestricted example, accompanied by the annexed figures.

DETAILED DESCRIPTION OF PARTICULAR EMBODIMENTS

Figure 1:
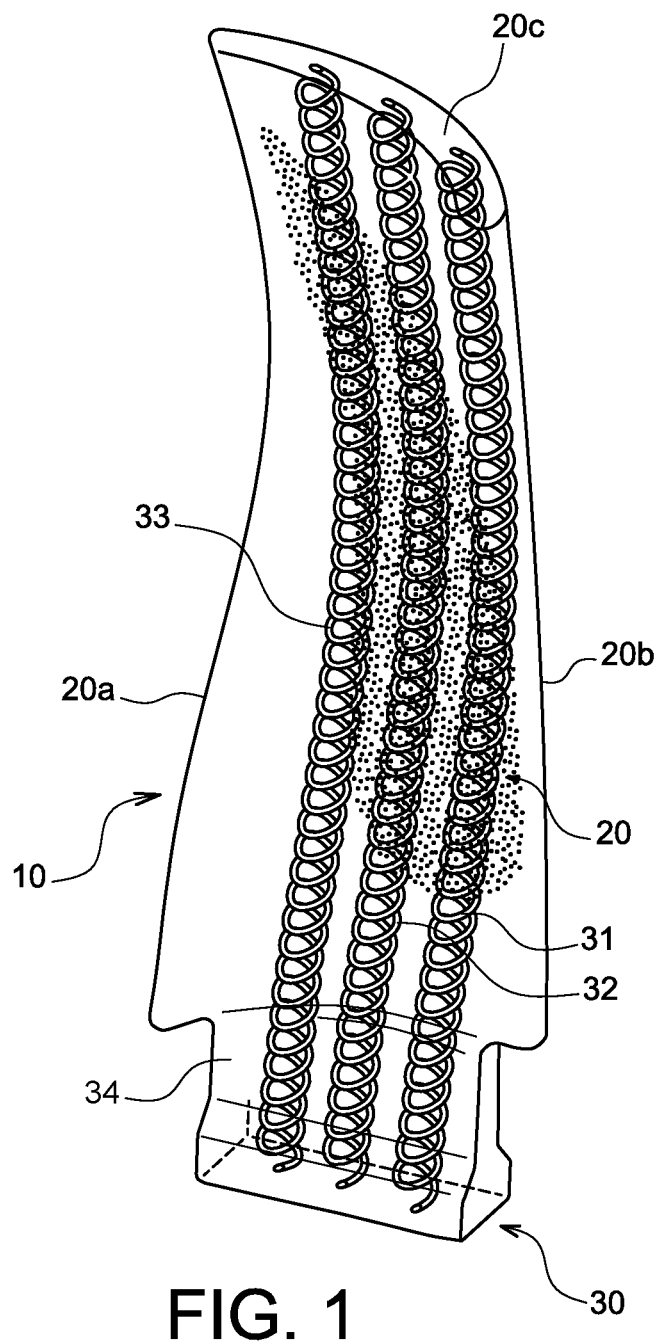
FIG. 1 is a perspective view of a composite material turbomachine blade comprising internal channels with a coiled shape obtained according to the method of the invention and used for the cooling of the blade (cooling channels).

The invention applies to different types of turbomachine blades, in particular turbine blades of different parts of gas turbines, for example a rotor blade of a low-pressure turbine (LP), such as the one shown in FIG. 1. The blade 10 of FIG. 1 comprises in a manner known per se, a vane 20, a root 30 formed by a portion of greater thickness, extended by a tang 34. The vane 20 extends in the longitudinal direction between the root 30 and its tip 20c and has as a transversal cross-section a curved profile with a variable thickness between its leading edge 20a and its trailing edge 20b. The blade 10 is mounted on a turbine rotor (not shown) by engagement of the root 30 in a housing with a corresponding shape arranged at the periphery of the rotor.

In FIG. 1, the blade 10 comprises three internal channels 31, 32 and 33 with a coiled shape (cooling channels) for sucking in air via the root 30 and for blowing it out via the tip 20c of the vane 20. Note that the example taken here is a blade comprising three channels, in particular with a concern for simplification and clarity of FIG. 1, but it is entirely possible to manufacture blades comprising one, two, four or more channels.

Figure 2:
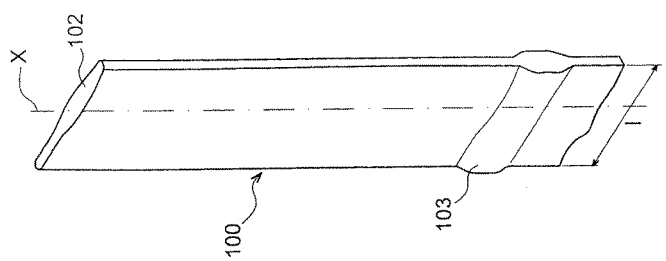
FIG. 2 very diagrammatically shows a three-dimensionally woven fiber blank for use in the manufacturing of a fiber preform for a blade such as the one shown in FIG. 1.

FIG. 2 very diagrammatically shows a fiber blank 100 from which a blade fiber preform can be shaped so that a composite material blade such as the one shown in FIG. 1 can be obtained after the densification steps by a matrix and the optional machining. The blank 100 is obtained by three-dimensional weaving or multilayer weaving and is intended, after shaping, to constitute a blade vane and root preform.

The blank 100 is made in the form of a strip extending generally in a direction X corresponding to the longitudinal direction of the blade to be made. The blank 100 has a variable thickness determined according to the profile thickness of the vane of the blade to be made. In its portion intended to form a root preform, the fiber blank presents extra thickness 103 determined as a function of the thickness of the root of the blade to be made. The blank 100 has a width 1 chosen as a function of the length of the developed (laid out flat) profile of the vane and of the root of the blade to be made.

A three-dimensional weaving mode of the fiber blank 100 shall now be described in more detail. It is assumed that the weaving is performed with warp threads extending in the longitudinal direction X of the blank, i.e. the longitudinal direction of the blade to be made, noting that a weaving with weft threads in this direction is also possible.

The bulging portion 102 providing the variation in thickness of the blank 100 over its width is obtained by using warp threads of a variable weight. In a variant or in addition, it is possible to vary the count of the warp threads (number of threads per unit of length in the weft direction), a lower count allowing for a more substantial thinning during the shaping of the preform by molding.

Figure 5:
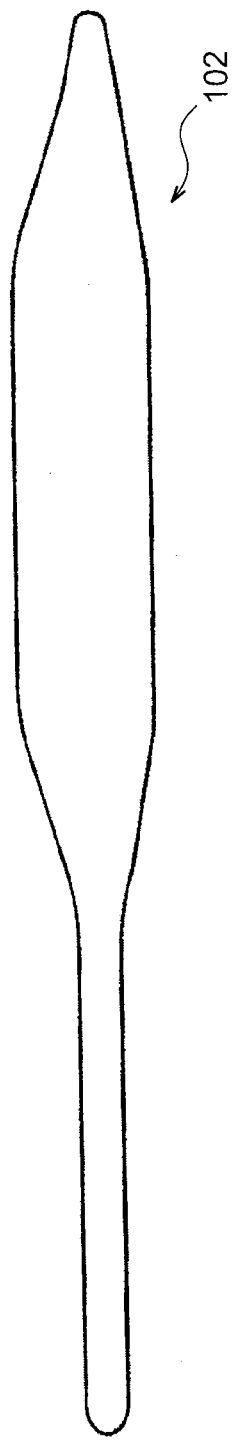
FIG. 5 is a cross-section view showing the profile, flattened, of a blade such as the one of FIG. 2.
Figure 6:
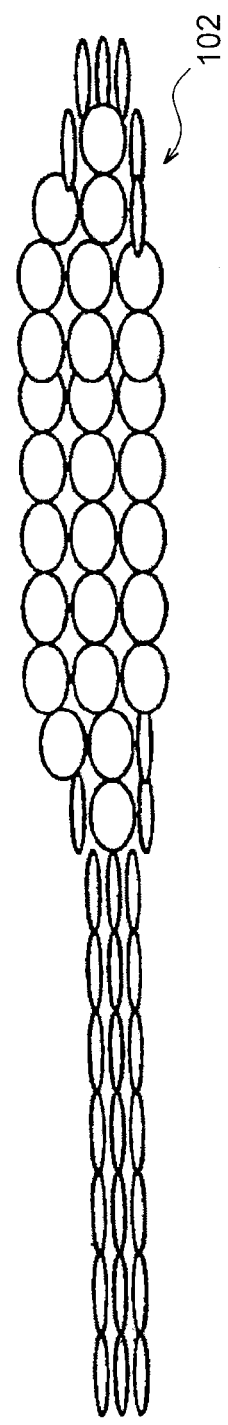
FIG. 6 is a cross-section view of a set of layers of warp threads enabling a profile such as the one of FIG. 5 to be obtained.
Figure 7A:
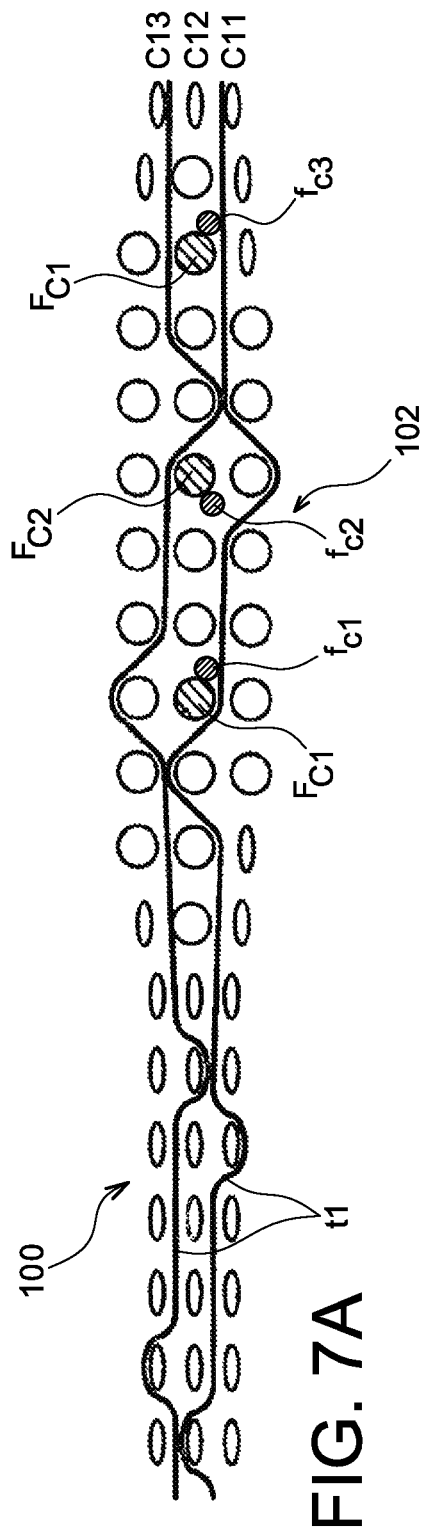
FIGS. 7A and 7B are warp cross-section views showing a weaving mode for weaving the fiber blank of FIG. 2.
Figure 7B:
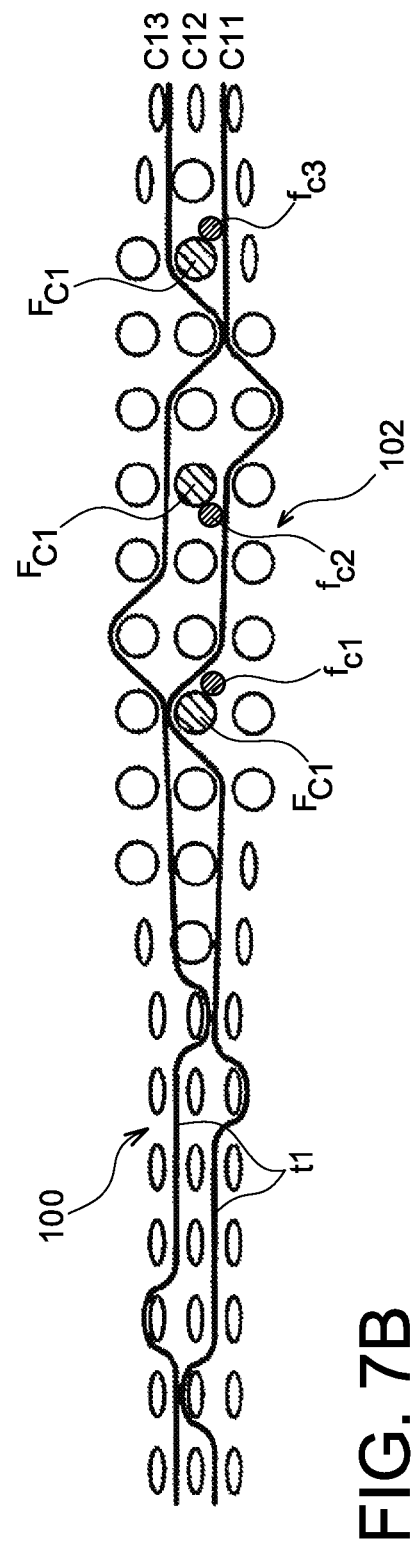

Thus, in order to obtain a blade vane profile as shown in flat projection in FIG. 5, it is possible to use 3 layers of warp threads of varying weight and count as shown in FIG. 6. In one embodiment, the threads used, other than those intended to form the first and second internal channels as explained hereinafter, can be threads of alumina Al2O3 having, for example, a weight (number of filaments) of 167 Tex (400 filaments). In order to form the thickness variation of the blank 100 to form the bulging portion 102, threads with a greater weight, for example 333 Tex (750 filaments), are used. If 333 Tex threads are not available, they may be obtained by uniting two threads of 167 Tex by wrapping. Of course, depending on the weight of the available threads, various combinations of numbers of layers of threads and variations in count and in weight may be adopted for the profile to be obtained. FIGS. 7A and 7B show, as a warp cross-section, two successive planes of a weave that can be used for the weaving of the fiber blank 100. The strip of the fiber blank 100 comprises a set of warp threads layers, with the number of layers in this example being equal to 3 (layers C11. C12, C13). The warp threads are linked together by weft threads t1 by three-dimensional weaving. In the example shown, the weaving is a multilayer weaving performed using a satin or multi-satin type weave. Other types of three-dimensional weaving could be used, for example a multilayer weaving with a multi-plain weave or an "interlock" weave. The term "interlock" is used therein to mean a weave in which each layer of weft threads links together a plurality of layers of warp threads with all of the threads in a given weft column having the same movement in the weave plane. Various modes of three-dimensional weaving are in particular described in WO 2006/136755 (reference [2]). In this example embodiment, three of the threads with 750 filaments of the layer C12, FC1, FC2 and FC3, i.e. the internal layer of warp threads located between the layers of warp threads C11 and C13, are made of a first sacrificial or temporary material, i.e. a material that is suitable for being eliminated after the first sintering, for example by being evaporated (thermal treatment at a temperature greater than or equal to the melting or combustion temperature of the first material). Naturally, the number of warp threads layers may be greater depending on the intended thickness and mechanical properties. Around each of these three threads FC1, FC2 and FC3 is wound a thread made of a second sacrificial material, fC1, fC2 and fC3. The threads FC1, FC2, FC3, fC1, fC2 and fC3 may have different weights or diameters depending on the size of the first and second internal channels to be made.

Note that, regardless of the number of layers of warp threads of the fiber blank (greater than or equal to 3), the threads made of a first sacrificial material and the threads made of a second sacrificial material that surround them may be introduced into any layer of warp threads located between the two superficial layers of warp threads intended to form the skins of the blade.

Figure 4:
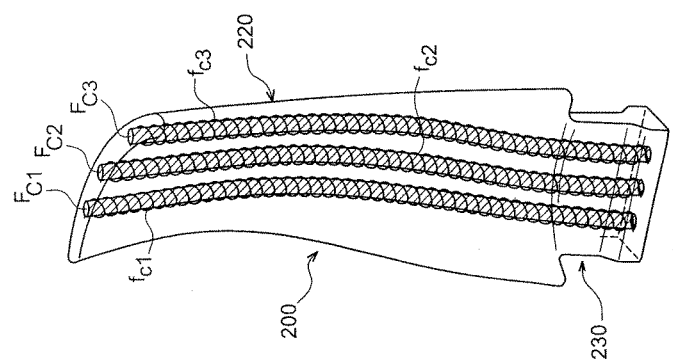
FIGS. 3 and 4 show the successive steps in making a fiber preform for a blade such as the one shown in FIG. 1, using the fiber blank of FIG. 2.
Figure 3:
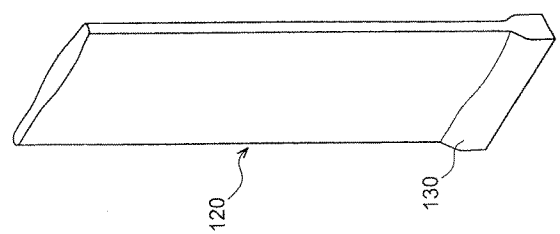

FIGS. 3 and 4 very diagrammatically show how a fiber preform having a shape close to that of the blade to be manufactured can be obtained using the fiber blank 100. In FIG. 3, the fiber blank 100 is cut at an end in the extra thickness 103 and at another end in order to have a strip 120 with a length corresponding to the longitudinal dimension of the blade to be manufactured, with a bulging portion 130 formed by a portion of the extra thickness 103 and located at a location corresponding to the position of the root of the blade to be manufactured.

A fiber preform 200 of the blade to be manufactured is then obtained by molding with deformation of the strip 102 in order to reproduce the curved and twisted profile of the vane of the blade as shown in FIG. 4, followed by the application of heat in order to provoke sintering. A preform is thus obtained with a vane preform portion 220 and a root preform portion 230 (including a tang preform portion). More precisely, the fiber preform 200 is obtained by densifying the fiber blank 100 with a matrix. The densification of the fiber blank consists in filling in the porosity of the blank throughout all or part of its volume with the material that constitutes. The composite material matrix constituting the blade may be obtained in a manner known per se using the liquid technique, which consists in impregnating the fiber blank with an aqueous suspension containing particles made of oxide ceramic (slush), intended to form the material of the matrix after sintering. The preform is placed in a mold that may be closed in leaktight manner and having a recess with the final shape of the molded part and which can in particular have a twisted shape corresponding to the final shape of the blade. Thereafter, the mold is closed and the aqueous suspension (slush) is injected into the entire recess in order to impregnate all of the fiber portion of the preform. The transformation of the particles into oxide matrix is carried out by sintering thermal treatment, generally carried out outside of the mold, preferably after the eliminating of the water from the slush. If the threads of ephemeral sacrificial nature $F_{C1}$, $F_{C2}$, $F_{C3}$, $f_{C1}$, $f_{C2}$, $f_{C3}$ made of a first and second sacrificial materials are made of a heat-fusible material, the first and second materials are chosen in order to be fusible at a temperature lower than, for the first material, and lower than or equal to, for the second material, the sintering temperature of the matrix.

Figure 8A:
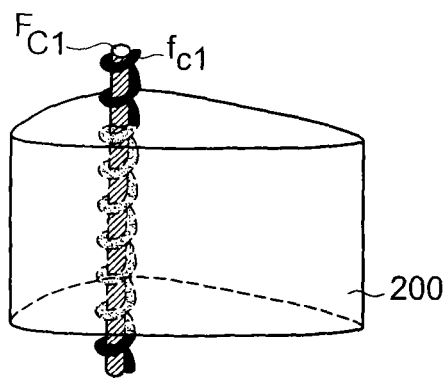
FIGS. 8A to 8C show the successive steps in manufacturing a blade such as that shown in FIG. 1, using the fiber blank of FIG. 2.
Figure 8B:
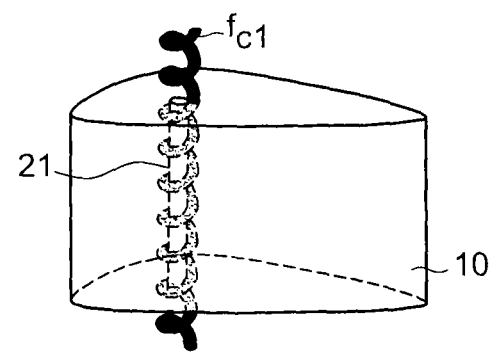
Figure 8C:
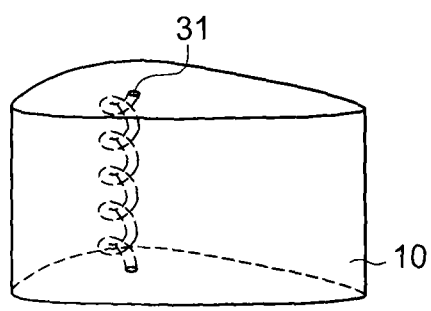

The manufacture of an alumina/alumina composite material blade shall now be described briefly. The weft threads and the warp threads are alumina threads of 333 Tex (750 filaments), for example Nextel™ 610 threads manufactured by the company 3M (commercial reference). The threads $F_{C1}$, $F_{C2}$, $F_{C3}$, $f_{C1}$, $f_{C2}$ and $f_{C3}$ made of a first and of a second sacrificial material are made of heat-fusible materials, for example polymer threads, for example polyvinyl acetate or polyethylene, for the threads $F_{C1}$, $F_{C2}$ and $F_{C3}$, and metal threads (for example made of aluminium) or made of carbon, for the threads $f_{C1}$, $f_{C2}$ and $f_{C3}$. The threads $f_{C1}$, $f_{C2}$ and $f_{C3}$ are wound around threads $F_{C1}$, $F_{C2}$ and $F_{C3}$ (this is also referred to as co-twistage of the metal or carbon thread on the polymer thread) and the weaving of these threads with the weft threads and the warp threads is carried out in order to make a fiber blank of the blade. These threads can then be uncovered and scoured. Thereafter, the fiber blank is shaped into a preform and then the first impregnation of the preform with the alumina slush is carried out. FIG. 8a diagrammatically shows a thread $f_{C1}$ (metal or carbon thread) wound around a thread $F_C$ (polymer thread) in a preform of the blade (the preform has been truncated in order to better see the threads $f_{C1}$ and $F_{C1}$). Threads made of polymer can be eliminated by a thermal treatment at an average temperature (550° C.-1000° C.), sufficient to destroy the threads made of polymer without destroying the metal or carbon threads. This temperature is also sufficient to obtain a partial sintering of the matrix, which is sufficient to maintain the structure of the part by taking suitable handling precautions. Of course, metal or carbon threads can also be chosen with a melting temperature greater than 1200° C. (corresponding to the sintering temperature of the matrix made of alumina) if it is desired to obtain a complete sintering of the structure, after the eliminating of threads made of the first material. FIG. 8b shows the blade after the steps of first impregnation of the preform and of first sintering, having led to the eliminating of the thread $F_{C1}$ and to the forming of a first internal channel 21. A second impregnation of the preform is then carried out, in order to improve the impregnation at the core, by having the slush penetrate through the channels 21 created by the destruction of the polymer threads. The sintering operation is then repeated (temperature between 600° C. and 1000° C. or equal to 1200° C. depending on the composition of the threads made of metal or carbon). To conclude, the threads made of metal or carbon are eliminated by a chemical attack (for example by using a base compound, for example NaOH or KOH, for threads made of aluminium), thus forming new channels, which will serve as cooling channels for the blade. Eventually, another sintering operation is carried out at the sintering temperature of the matrix, 1200° C. for example for a matrix made of alumina. FIG. 8c shows the blade after the steps of re-impregnating the preform and of chemical treatment, having led to the formation of a channel 31.

After the elimination of the threads $f_{C1}$, $f_{C2}$ and $f_{C3}$, the blade 10 of FIG. 1 is obtained, i.e. a blade having a twisted shape and comprising three internal channels 31 to 33 with a coiled shape.

REFERENCES MENTIONED

[1] FR 2 955 609
[2] WO 2006/136755

The invention claimed is:

1. A method for manufacturing a composite material turbomachine blade, which comprises a fiber reinforcement densified by a matrix obtained by sintering particles and which has at least one cooling channel, the method comprising:
   a) shaping a fiber blank in order to obtain a preform of the blade to be manufactured, with said fiber blank comprising a first plurality of threads and a second plurality of threads woven together, with the threads of the first plurality of threads being arranged in successive layers and extending in a longitudinal direction of the fiber blank which corresponds to a longitudinal direction of the blade to be manufactured, at least one layer of threads of the first plurality of threads located in the internal portion of the fiber blank comprising one or more threads made of a first sacrificial material and one or more threads made of a second sacrificial material, at least one thread made of the first sacrificial material being surrounded along its longitudinal direction by a thread made of the second sacrificial material;
   b) a first densification of the preform comprising a first impregnation of the preform with an aqueous suspension containing particles of the matrix and a first sintering of the impregnated preform at a first temperature in order to obtain a blade having a fiber reinforcement constituted by said preform and densified by the matrix;
   c) eliminating each thread made of the first sacrificial material, thus forming, for each thread of the first sacrificial material, an internal channel in the blade;
   d) a second densification of the preform comprising a second impregnation of the preform with an aqueous suspension containing particles of the matrix, with the aqueous suspension being introduced through each internal channel formed at step c) and a second sintering of the impregnated preform at a second temperature;
   e) eliminating each thread made of the second sacrificial material, thus forming, for each thread of the second sacrificial material, a cooling channel in the blade; and
   f) if the second temperature of the second sintering is lower than a sintering temperature of the matrix, a third sintering of the matrix at a temperature greater than or equal to the sintering temperature of the matrix.

2. The method according to claim 1, wherein the first and second sacrificial materials are materials chosen amongst heat-fusible materials, materials that can be eliminated by a chemical agent and materials that can be eliminated by combustion under air, with these materials being non-soluble in the aqueous suspension and respectively having a melting or combustion temperature ($T_1$) and ($T_2$), with ($T_1$) lower than ($T_2$).

3. The method according to claim 2, wherein step b) and step c) are concomitant.

4. The method according to claim 2, wherein step c) is carried out by thermal treatment at a temperature greater than or equal to a melting or combustion temperature of each thread made of the first material and lower than a melting or combustion temperature of each thread made of the second material, and step e) is carried out by thermal treatment at a temperature greater than or equal to the melting or combustion temperature of each thread made of the second material or by application of a chemical agent.

5. The method according to claim 4, wherein the melting or combustion temperatures of the first and second sacrificial materials ($T_1$) and ($T_2$) are lower than the sintering temperature of the matrix, the first sintering is carried out at a temperature greater than the melting or combustion temperature of the first material and lower than or equal to the melting or combustion temperature of the second material, and the second sintering is carried out at a temperature lower than the melting or combustion temperature of the second material.

6. The method according to claim 4, wherein the melting or combustion temperatures of the first ($T_1$) and of the second ($T_2$) sacrificial material are respectively lower than or equal to and greater than the sintering temperature of the matrix, the first sintering is carried out at a temperature greater than the melting or combustion temperature of the first material ($T_1$) and lower than or equal to the sintering temperature of the matrix, and the second sintering is carried out at a temperature lower than or equal to the sintering temperature of the matrix.

7. The method according to claim 1, wherein the particles of the aqueous suspension are made from an oxide ceramic material.

8. The method according to claim 1, wherein threads of the first plurality of threads, other than the one or more threads made of the first sacrificial material and the one or more threads of the second sacrificial material are made of an oxide ceramic material, and the threads of the second plurality of threads are made of an oxide ceramic material.

* * * * *

UNITED STATES PATENT AND TRADEMARK OFFICE
CERTIFICATE OF CORRECTION

PATENT NO. : 9,802,869 B2
APPLICATION NO. : 14/099094
DATED : October 31, 2017
INVENTOR(S) : Michael Podgorski et al.

It is certified that error appears in the above-identified patent and that said Letters Patent is hereby corrected as shown below:

In the Specification

Column 7, Line 2, change "C11. C12, C13" to --C11, C12, C13--;

Column 7, Line 15, change "FC1, FC2 and FC3" to --$F_{C1}$, $F_{C2}$ and $F_{C3}$--;

Column 7, Line 25, change "FC1, FC2 and FC3" to --$F_{C1}$, $F_{C2}$ and $F_{C3}$--;

Column 7, Line 26, change "fC1, fC2 and fC3" to --$f_{C1}$, $f_{C2}$ and $f_{C3}$--;

Column 7, Line 26, change "threads FC1" to --threads $F_{C1}$--;

Column 7, Line 27, change "FC2, FC3, fC1, fC2 and fC3" to --$F_{C2}$, $F_{C3}$, $f_{C1}$, $f_{C2}$ and $f_{C3}$--; and Column 8, Line 34, change "thread $F_C$" to --thread $F_{C1}$--.

Signed and Sealed this
Twenty-eighth Day of May, 2019

Andrei Iancu
*Director of the United States Patent and Trademark Office*